US010440527B2

(12) United States Patent
Bourge et al.

(10) Patent No.: US 10,440,527 B2
(45) Date of Patent: Oct. 8, 2019

(54) MESSAGE MANAGEMENT METHOD AND DEVICE

(71) Applicant: ORANGE, Paris (FR)

(72) Inventors: Fabrice Bourge, Colomby-sur-Thaon (FR); Benjamin Froc, Ifs (FR); Olivier Lepetit, Deauville (FR); Francis Berthomieu, Caen (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 14/945,819

(22) Filed: Nov. 19, 2015

(65) Prior Publication Data

US 2016/0150385 A1 May 26, 2016

(30) Foreign Application Priority Data

Nov. 24, 2014 (FR) ..................................... 14 61343

(51) Int. Cl.
*H04W 4/00* (2018.01)
*H04W 4/12* (2009.01)
*H04L 12/58* (2006.01)

(52) U.S. Cl.
CPC ............... *H04W 4/12* (2013.01); *H04L 51/02* (2013.01); *H04L 51/043* (2013.01); *H04L 51/14* (2013.01); *H04L 51/24* (2013.01); *H04L 51/26* (2013.01)

(58) Field of Classification Search
CPC ......... H04W 4/16; H04W 8/245; H04W 4/14; H04L 29/08108
USPC ........... 455/414.1, 417, 418, 466; 370/310.2, 370/312; 379/211.02; 709/206, 207, 709/238, 310
See application file for complete search history.

(56) References Cited

U.S. PATENT DOCUMENTS

| 5,467,388 A * | 11/1995 | Redd, Jr. ............... H04M 1/663 379/196 |
| 5,757,899 A * | 5/1998 | Boulware ............. H04M 3/436 379/196 |
| 6,208,726 B1 * | 3/2001 | Bansal ................ H04L 12/2854 379/196 |
| 6,519,335 B1 * | 2/2003 | Bushnell ............... H04M 1/663 379/208.01 |
| 6,711,154 B1 * | 3/2004 | O'Neal ............... H04L 12/5835 370/352 |

(Continued)

FOREIGN PATENT DOCUMENTS

EP 1 852 789 A1 11/2007
WO WO 01/09753 A2 2/2001

OTHER PUBLICATIONS

Preliminary French Search Report dated Jul. 9, 2015 for French Application No. FR 1461343 filed Nov. 24, 2015, 2 pages.

*Primary Examiner* — Stephen M D Agosta
(74) *Attorney, Agent, or Firm* — Knobbe, Martens, Olson & Bear, LLP

(57) ABSTRACT

One embodiment relates to a message management method comprising an interception process for intercepting a first message sent to a device of a user; an estimation process for estimating a level referred to as the "user interruptibility level" representing the extent to which the user can be interrupted in their current activity; an estimation process for estimating a level of importance of the first message; and a processing process for processing the first message as a function of the user interruptibility level and of the importance level of the first message.

12 Claims, 1 Drawing Sheet

(56) References Cited

U.S. PATENT DOCUMENTS

| | | | | |
|---|---|---|---|---|
| 6,772,196 | B1* | 8/2004 | Kirsch | G06Q 10/107 707/999.005 |
| 8,448,072 | B1* | 5/2013 | Lai | G06Q 10/107 715/753 |
| 8,565,219 | B2* | 10/2013 | Tidwell | H04M 1/663 370/352 |
| 2003/0046421 | A1* | 3/2003 | Horvitz | G06Q 10/107 709/238 |
| 2004/0128359 | A1* | 7/2004 | Horvitz | G05B 19/404 709/207 |
| 2004/0154022 | A1* | 8/2004 | Boss | G06Q 10/107 719/310 |
| 2005/0080864 | A1* | 4/2005 | Daniell | H04L 12/581 709/206 |
| 2005/0149622 | A1* | 7/2005 | Kirkland | H04L 51/04 709/207 |
| 2005/0171955 | A1* | 8/2005 | Hull | G06Q 50/01 |
| 2006/0168060 | A1* | 7/2006 | Briand | G06Q 10/107 709/206 |
| 2007/0238474 | A1* | 10/2007 | Ballas | H04L 12/5895 455/466 |
| 2008/0112546 | A1* | 5/2008 | Fletcher | H04M 1/247 379/88.05 |
| 2009/0132662 | A1 | 5/2009 | Sheridan et al. | |
| 2009/0157650 | A1* | 6/2009 | Chow | G06F 17/30893 |
| 2010/0023472 | A1* | 1/2010 | Loeb | G06Q 10/107 706/47 |
| 2013/0097270 | A1* | 4/2013 | Plotkin | H04M 1/72547 709/206 |

* cited by examiner

MESSAGE MANAGEMENT METHOD AND DEVICE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57 in their entireties. In particular, the disclosure of French Patent Application FR 1461343, filed Nov. 24, 2014 is incorporated herein by reference in its entirety.

BACKGROUND OF THE INVENTION

One embodiment relates to the field of managing messages sent to a user.

The increasing use of real time or quasi-real time communications tools in a professional context (text or mobile telephony, instant messaging, short message service (SMS), email) serves to facilitate exchanges of information between people. Nevertheless, the immediate nature of such exchanges presents the drawback of interrupting the current activity of a user, which can be prejudicial to that activity, in particular if the activity requires a certain amount of concentration.

Such interruptions or sudden changes of activity can be disturbing for the user depending on the user's level of concentration, mood, the nature of the user's work, the frequency of interruptions, etc., and consequently can be detrimental to the operation of the business. The cognitive resources required for switching in impromptu manner from one activity to another and then returning to the current activity can be very great.

Conversely, a call or a message that is ignored can leave the caller/sender with the impression that the user does not desire to answer personally, or that the subject of the message is uninteresting, or that the message has not been received, where in fact it is merely that the user has not had the time to answer. This can lead to a negative impression on the part of the caller/sender.

One embodiment relates to a method and a device for managing messages to a user that improves this situation, at least to some extent.

Object and Summary of the Invention

One embodiment relates to a message management method comprising:

intercepting a first message sent to a device of a user;

estimating a level referred to as the "user interruptibility level" representing the extent to which the user can be interrupted in their current activity;

estimating a level of importance of the first message; and processing the first message as a function of the user interruptibility level and of the level of importance of the first message.

Correspondingly, one embodiment relates to a message management device comprising:

an interception module configured to intercept a first message sent to a device of a user;

an estimation module configured to estimate a level referred to as the "user interruptibility level" representing the extent to which the user can be interrupted in their current activity;

an estimation module configured to estimate a level of importance of the first message;

a processing module configured to process the first message as a function of the user interruptibility level and of the level of importance of the first message.

The methods and devices described herein may be used with respect to any type of messaging, and in particular to messaging in the context of communications and co-operation tools that generate text or voice messages, such as instant messaging (IM), SMS, email, fixed or mobile telephony.

In general manner, one embodiment relates to taking charge of the messages received by a user and that might interrupt the user's current activity for the purpose of avoiding the user to be immediately invited to engage in a conversation or to perform some other type of action, e.g. sending an answer.

One embodiment relates to minimizing interruptions that result from outside intrusions coming via the communications and co-operation tools, in particular for a colleague who is performing one or more tasks that require considerable thought and attention. This appropriate management of the interruption enables the request associated with the interruption to be processed automatically or semi-automatically, while taking account both of the importance of the request and of the level of interruptibility of the user.

In a particular embodiment, the user is considered to be interruptible (in other words available) or not interruptible (i.e. not available) as a function of the result of comparing said estimated interruptibility level with a first predefined threshold.

In a particular embodiment, the message management method includes a presentation process for presenting the first message to the user if the user is considered as being interruptible.

In a particular embodiment, the message management method includes, if the user is considered to be not interruptible and if the level of importance of the first message is greater than a second predefined threshold:

generating a second message optionally obtained from the first message; and presenting the second message to the user.

Thus, the user is interrupted only if the first message is considered as being important. By way of example, the second message that is presented may be a proposed answer to the first message or it may be a predefined message.

In a particular embodiment of the message management method, the second message is a proposed answer to the first message that is presented to the user for confirmation. This proposed answer optionally includes all or some of said first message.

The presentation of a proposed answer to the first message enables the user to avoiding wasting time by preparing an answer. It also enables the user to decide whether or not an answer formulated by the management system should be transmitted by that system.

In a particular embodiment, the message management method includes, if the user is considered as being not interruptible and if the level of importance of the first message is below the second threshold:

generating an answer to the first message; and sending the answer to the sender of the first message, which answer may possibly include all or part of said first message.

By way of example, the answer that is transmitted may be a message informing the sender that the user is not available and/or including a time within which an answer formulated by the user can be expected to reach the sender.

Sending an answer to the sender makes it possible to avoid the negative impressions that can be induced by not receiving any answer to a message.

In a particular embodiment, the message management method includes a logging process for storing the results of the processing that has been performed in a log. In particular, the log may store: the messages transmitted directly to the user; the answers proposed to the user for approval; the messages transmitted to the user's voice messaging service; and the answers sent to the sender of the message together with other information such as the time at which the processing was performed; the level of interruptibility of the user at the time a message was accepted; and the level of importance of a message.

In a particular embodiment, the level of interruptibility of the user is determined as a function of at least one parameter selected from: the frequency with which the user is typing on a keyboard of the terminal; the characteristics of mouse use on the terminal; the number of applications being executed on the terminal; the type of program that is active in the foreground of the terminal; the status of an instant messaging service of the terminal; and the content of a diary of the terminal.

In a particular embodiment, the level of importance of the first message is determined by analyzing its contents, by a characteristic of the sender, and/or by the number of first messages that have been received from the sender over a predefined time interval. In particular, if the sender sends the same first message several times over, its level of importance may increase.

In particular embodiments, the message management device makes use of components configured to perform the particular characteristics of the above-described management method. In particular, the message management device of the invention may include one or more of the modules listed below, taken singly or in combination:

a comparator module configured to compare the estimated level of interruptibility for the user with a first predefined threshold and for deciding whether the user is to be considered as being interruptible or not interruptible as a function of the result of the comparison;

a presentation module configured to present a first message to the user if the user is considered as being interruptible;

a generator module configured to act, if the user is considered as being non-interruptible and if the level of importance of the first message is greater than a second predefined threshold, configured to generate a second message, optionally derived from the first message, and to present the second message to the user;

when the second message contains a proposed answer to the first message, a confirmation module configured to obtain an instruction from the user confirming that the answer should be sent;

a generator module configured to act, if the user is considered as being non-interruptible and if the level of importance of the first message is less than the second threshold, configured to generate an answer to the first message and to send the answer to the sender of the first message; and a logging module configured to store the results of the processing that has been performed in a log.

In a first particular embodiment, the various processes of the message management method are determined by computer program instructions. Consequently, one embodiment relates to a computer program on a data medium, the program being suitable for being performed in a terminal or more generally in a computer, the program including instructions adapted to performing the processes of a message management method as described above.

The program may use programming language and be in the form of source code, object code, or code intermediate between source code and object code, such as in a partially compiled form, or in any other desirable form.

One embodiment relates to a computer readable data medium including instructions of a computer program as mentioned above.

The data medium may be any entity or device capable of storing the program. For example, the medium may comprise storage components, such as a read only memory (ROM), e.g. a compact disk (CD) ROM, or a microelectronic circuit ROM, or indeed magnetic recording components, such as a floppy disk or a hard disk.

Furthermore, the data medium may be a transmissible medium such as an electrical or optical signal that may be conveyed via an electrical or optical cable, by radio, or by other mechanisms or components. The program may in particular be downloaded from an Internet type network.

Alternatively, the data medium may be an integrated circuit in which the program is incorporated, the circuit being adapted to execute or to be used in the execution of the program in question.

BRIEF DESCRIPTION OF THE DRAWING

Particular characteristics and advantages of the methods and devices described herein appear from the following detailed description of the figures, in which.

DETAILED DESCRIPTION OF AN EMBODIMENT

Figure 1:
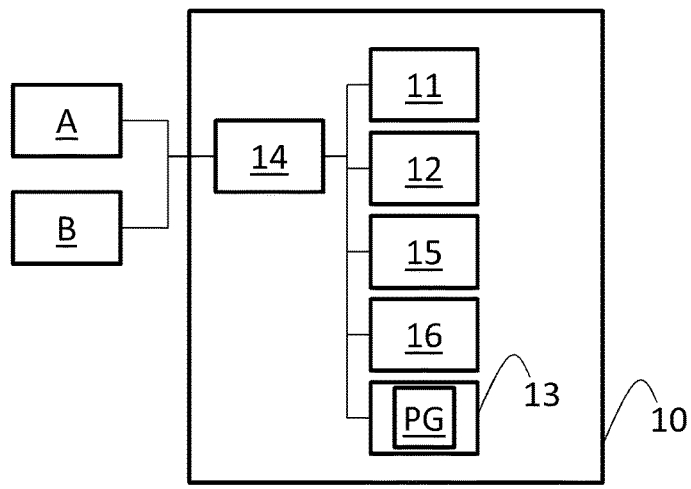
FIG. 1 is a diagram showing the hardware architecture of an exemplary message management device.

FIG. 1 is a diagram showing the hardware architecture of an exemplary message management device 10.

The management device is suitable for intercepting messages sent by pieces of equipment A (user terminals, servers, . . . ) to a user terminal B.

In a variant embodiment, the device 10 could be incorporated in the terminal B.

In the presently-described embodiment, the device 10 comprises in particular a processor 11, a ROM 13, a random access memory (RAM) 12, a communications module 14 for communicating with the terminals A and B, a speech-to-text module 15 for automatically recognizing speech, and a rewritable non-volatile memory 16.

The ROM 13 constitutes a data medium that is readable by the processor 11 and that stores a computer program PG as described herein, including instructions for executing processes of a message management method as described herein, the main processes of the management method being described below with reference to FIG. 2, in a particular embodiment.

In equivalent manner, the computer program defines functional modules (pieces of software) of the message management device 10, such as in particular:

a comparator module configured to compare the estimated level of interruptibility for the user with a first predefined threshold and for deciding whether the user should be considered as being interruptible or not interruptible as a function of the results of the comparison;

a presentation module configured to present the first message to the user if the user is considered as being interruptible;

a generator module configured to act, if the user is considered to be non-interruptible and if the level of importance of the first message is greater than a second predefined threshold, to generate a second message possibly derived from the first message, and configured to present the second message to the user;

when the second message contains a proposed answer to the first message, a confirmation module configured to obtain an instruction from the user to confirm that this answer is to be sent;

a generator module configured to act, if the user is considered as being non-interruptible and if the level of importance of the first message is less than the second threshold, configured to generate an answer to the first message and to send this answer to the sender of the first message; and a logging module configured to store the results of the processing that has been performed in a log.

The functions are described below in greater detail with reference to the processes of the management method shown in FIG. 2.

Figure 2:
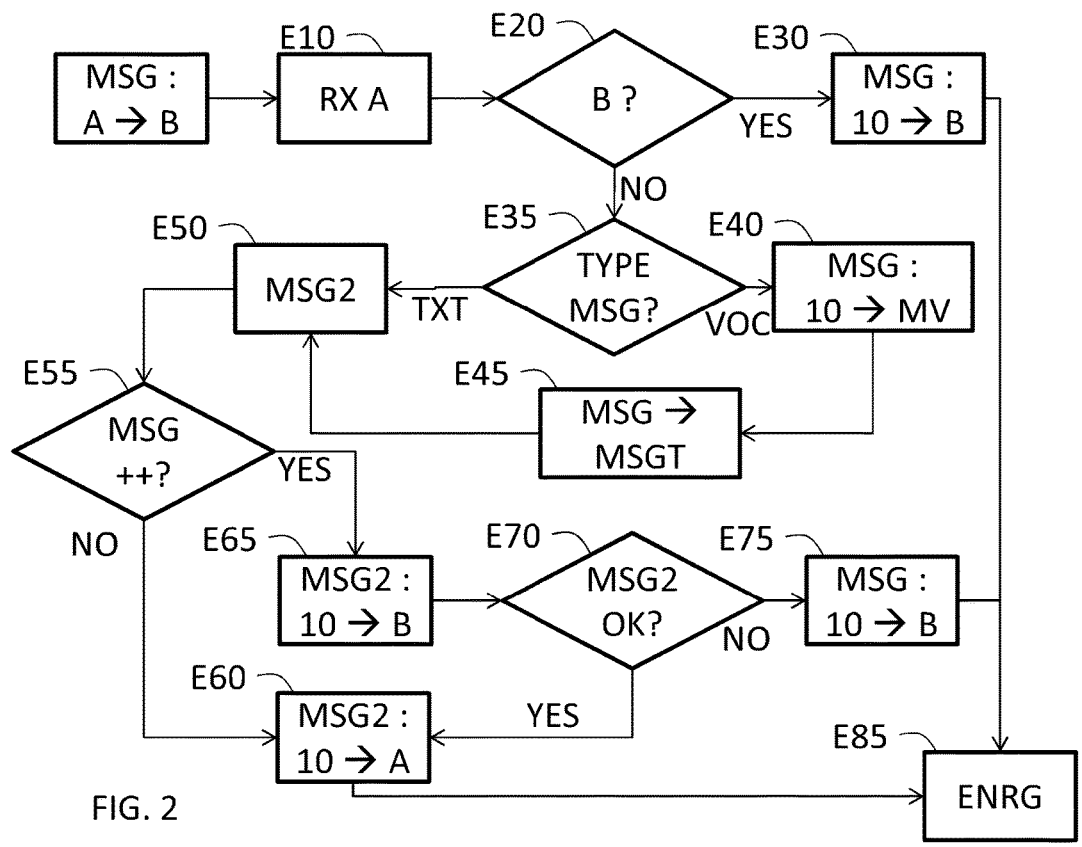
FIG. 2 shows the main processes of a message management method in accordance with a particular implementation in a particular scenario.

With reference to FIG. 2, it is assumed that the piece of equipment A sends a message MSG to the terminal B.

This message is intercepted by the device 10 during a process E10. If the message MSG is a voice message, it is converted, in this implementation, into text for processing.

During a process E20, the device 10 determines whether, and to what extent, the user of the terminal B can be interrupted in a current activity. If the user can be interrupted, then the device 10 forwards the message that was intercepted in process E10 to the terminal B during a process E30.

If, during process E20, the device 10 considers that the user of the terminal B should not be interrupted, then, during a process E35, the device 10 determines the type of the message MSG.

If the message is a voice message, the device 10 directs the call to terminal B's voicemail during a process E40.

In the presently-described embodiment, if the device 10 determines during the process E35 that the message MSG is a text message, then the device 10 acts during a process E50 to use the text message MSG to construct a message MSG2 that is a "second" message as described herein.

In the presently-described embodiment, this second message MSG2 is an answer to the message that was intercepted in process E10, which answer may contain all or part of the first message. Depending on the importance of the first message, and as described below, this answer may be sent directly to the sender of the first message or it may be sent after it has been confirmed and possibly modified by the user of the terminal B.

If, during process E35, the device 10 determines that the message MSG is a voice message, the device 10 transcribes the voice message into a text message MSGT during a process E45, and then constructs the second message MSG2 from the text message MSGT during the process E50.

During a process E55, the device 10 determines the level of importance of the message MSG that was intercepted in process E10. If the device 10 considers that the message MSG is sufficiently important for the user of terminal B to be interrupted in their current activity, then the device 10 sends the message MSG2 to the user of the terminal B during a process E65 and asks the user of the terminal B to confirm whether or not the proposed answer contained in the message MSG2 is to be sent to the terminal A.

The device 10 obtains the answer from the user of terminal B during a process E70.

If the answer from the user of terminal B is positive, then the device 10 sends the proposed answer contained in the message MSG2 and as prepared in process E50 to the terminal A.

If, during process E55, it is determined that the message MSG is not sufficiently important or that it does not warrant disturbing the user of terminal B, then the device 10 sends the proposed answer contained in the message MSG2 directly to the terminal A during a process E60, without asking for explicit instructions on this topic from the user of terminal B. Thus, the user of terminal B is not interrupted.

If during process E70, the user of terminal B gives a negative answer, not confirming the proposed answer contained in the message MSG2 proposed by the device 10, then the device 10 acts during a process E75 to transmit the message MSG as intercepted in process E10 to the terminal B for it to be processed by the user B.

In the presently-described embodiment, if there is no answer from the user during process E70 within a predetermined duration, then that "no answer" is processed as a negative answer.

In the presently-described embodiment, information about the processing performed in process E30, E60, or E75 is entered into a log that is stored, during a process E85, in the rewritable non-volatile memory 16.

In the above-described embodiment, the interruptibility of the user is binary. In another embodiment, the level of interruptibility of the user may have more than two values, for example it may vary over a scale of 1 to 10. By convention, low values correspond to a high degree of interruptibility because the user is more available, and conversely high values correspond to a low degree of interruptibility, when the user is less available. By way of example, a first threshold may be defined on this first scale, e.g. 5, above which it is considered that the user is not available.

Likewise, in a particular embodiment, the level of importance of the first message may also vary over a second scale, where low values correspond to a message of low importance, and high values correspond to a message that is important. By way of example, it is possible to define a scale going from 1 to 9, and a second threshold on this second scale, e.g. 6, above which it is considered that a message is sufficiently important to interrupt the current activity of the user.

In a particular embodiment, the level of interruptibility of the user may be determined as a function of at least one parameter selected from: the frequency with which the user is typing on a keyboard; characteristics of how a mouse is being used; the number of applications that are being executed on the terminal; the type of program that is active in the foreground on the terminal (web browser, word processor, . . . ); the status of an instant messaging service (do not disturb, . . . ); the content of a diary, . . . .

By way of example, it may be considered that as soon as the level of interruptibility is below the first threshold, the user can be interrupted, and messages that are intercepted by the mechanisms described herein are forwarded directly to the user.

For example, if the first threshold is set at 5, it may be decided that:

the level of interruptibility of the user is equal to 1.2 when the user is making little or no use of the keyboard, is moving the mouse little or not at all, and the only program active on the terminal is a web browser; and the level of interruptibility of the user is equal to 7.9 when the status of the instant messaging service is "do not disturb", the active application is a word processor, and use of the keyboard and of the mouse is intensive.

In a particular embodiment, the level of importance of the first message may be determined by analyzing its content, e.g. as a function of detecting key words ("urgent", "available", "have a coffee", "?", . . . ). This analysis may also rely on semantic analysis tools.

The level of importance of the message may also increase if the message is repeated or if it follows on from receiving other earlier messages coming from the same sender and analogous to the current message.

In a particular embodiment, when the user is not interruptible, the methods and the devices described herein are suitable for generating a message and for sending that message:

either directly to the sender of the first message;

or else to the user of the destination terminal of the first message for approval.

The second message may be in the form of a notification. It may optionally be constructed on the basis of the content of the first message, and it may possibly include information about the moment from when the user is likely to become available.

For example, when the device 10 receives a message containing "how about a coffee?", then the device 10 may consult the user's diary and generate a message containing: "I'll be available to have a coffee after 11:00 AM".

In general manner, messages transmitted to the user of terminal B during processes E30, E65, and E75, and to the user of terminal A during process E60 and to the voicemail during process E40 are transmitted in formats that are compatible with the terminals, pieces of equipment, or applications to which they are sent. Where necessary, such messages may be synthesized vocally before being sent.

What is claimed is:

1. A message management method performed by a message management device, the method comprising:
   intercepting a first message sent to a device of a user;
   estimating a user interruptibility level, the user interruptibility level representing the extent to which said user can be interrupted in their current activity, the user interruptibility level being independent of the content of the first message;
   processing said first message as a function of said user interruptibility level, wherein said user is considered as being interruptible or not interruptible as a function of the result of comparing said estimated interruptibility level with a first threshold;
   if said user is considered as being interruptible, presenting said first message to said user;
   if said user is considered as being non-interruptible, estimating a level of importance of the first message, wherein the level of importance of said first message is estimated by analyzing its contents, by a characteristic of the sender, and/or by the number of first messages that have been received from the sender over a predefined time interval; and
   if said level of importance of the first message is below a second threshold:
      sending an answer to the first message to the sender of said first message, said answer being a function of the first message; and
   if said level of importance of the first message is higher than the second threshold:
      generating a second message based on the content of the first message, wherein the second message contains a proposed answer to said first message that is to be confirmed by said user, the second message including all or part of the first message;
      sending the second message to the user of the device for confirmation; and
      in case of confirmation by the user, sending the second message to the sender of the first message.

2. A management method according to claim 1, further comprising a storage process of storing the results of said processing in a log.

3. A computer having stored thereon a program including instructions for performing the message management method according to claim 1 when said program is executed by said computer.

4. A non-transitory computer readable data medium having stored thereon a computer program including instructions for performing the message management method according to claim 1 when said instructions are executed by a processor.

5. A management method according to claim 1, wherein the answer includes at least a part of said first message.

6. A management method according to claim 5, wherein the answer includes all of said first message.

7. A management method according to claim 1, wherein generating a second message comprises generating a second message based on the content of the first message, the method additionally comprising presenting said first message to said user if said user is considered as being interruptible.

8. A management method according to claim 7, wherein the second message contains a proposed answer to said first message that is to be confirmed by said user.

9. A management method according to claim 7, wherein the second message contains a proposed answer to said first message that is to be confirmed by said user, and wherein the second message includes at least a part of said first message.

10. A management method according to claim 1, the method further comprising a storing the results of said processing in a log.

11. A message management device comprising:
   an interception module configured to intercept a first message sent to a device of a user;
   an estimation module configured to estimate a user interruptibility level, the user interruptibility level representing the extent to which said user can be interrupted in their current activity, the user interruptibility level independent of the content of the first message;
   a processing module configured to process said first message as a function of said user interruptibility level, with said user being considered as interruptible or not interruptible as a function of the result of comparing said estimated interruptibility level with a first threshold, and configured to present said first message to said user if said user is considered as being interruptible, and
   an estimation module configured to estimate a level of importance of said first message if said user is considered as not interruptible, wherein the level of importance of said first message is estimated by analyzing its contents, by a characteristic of the sender, and/or by the number of first messages that have been received from the sender over a predefined time interval;

wherein the processing module is further configured to, if said user is considered as being not interruptible and if said level of importance of the first message is less than a second threshold, send an answer to the first message to the sender of said first message, said answer being a function of the first message; and wherein the processing module is further configured to, if said user is considered as being not interruptible and if said level of importance of the first message is higher than the second threshold:

generate a second message based on the content of the first message, wherein the second message contains a proposed answer to said first message that is to be confirmed by said user, the second message including all or part of the first message, send the second message to the user of the device for confirmation, and, in case of confirmation by the user, send the second message to the sender of the first message.

12. A message management method performed by a message management device, the method comprising:

intercepting a first message sent to a device of a user;

estimating a user interruptibility level, the user interruptibility level representing the extent to which the user can be interrupted in their current activity, the user interruptibility level being independent of the content of the first message;

comparing the estimated interruptibility level with a first threshold to determine whether the user is considered as being interruptible or not interruptible as a function of the result of the comparison of the estimated interruptibility level with the first threshold; and processing the first message based on the interruptibility level of the user by:

presenting the first message to the user if the comparison of the estimated interruptibility level with the first threshold indicates that the user is interruptible; and if the comparison of the estimated interruptibility level with the first threshold indicates that the user is not interruptible:

estimating a level of importance of the first message, wherein the level of importance of said first message is estimated by analyzing its contents, by a characteristic of the sender, and/or by the number of first messages that have been received from the sender over a predefined time interval, comparing the level of importance to a second threshold, and:

sending an answer to the first message to the sender of the first message if the level of importance of the first message is below the second threshold, the answer being a function of the first message; and if the level of importance of the first message is higher than the second threshold:

generating a second message based on the content of the first message, wherein the second message contains a proposed answer to the first message, the second message including all or part of the first message, sending the second message to the user of the device for confirmation; and in response to confirmation by the user, sending the second message to the sender of the first message.

* * * * *